UNITED STATES PATENT OFFICE.

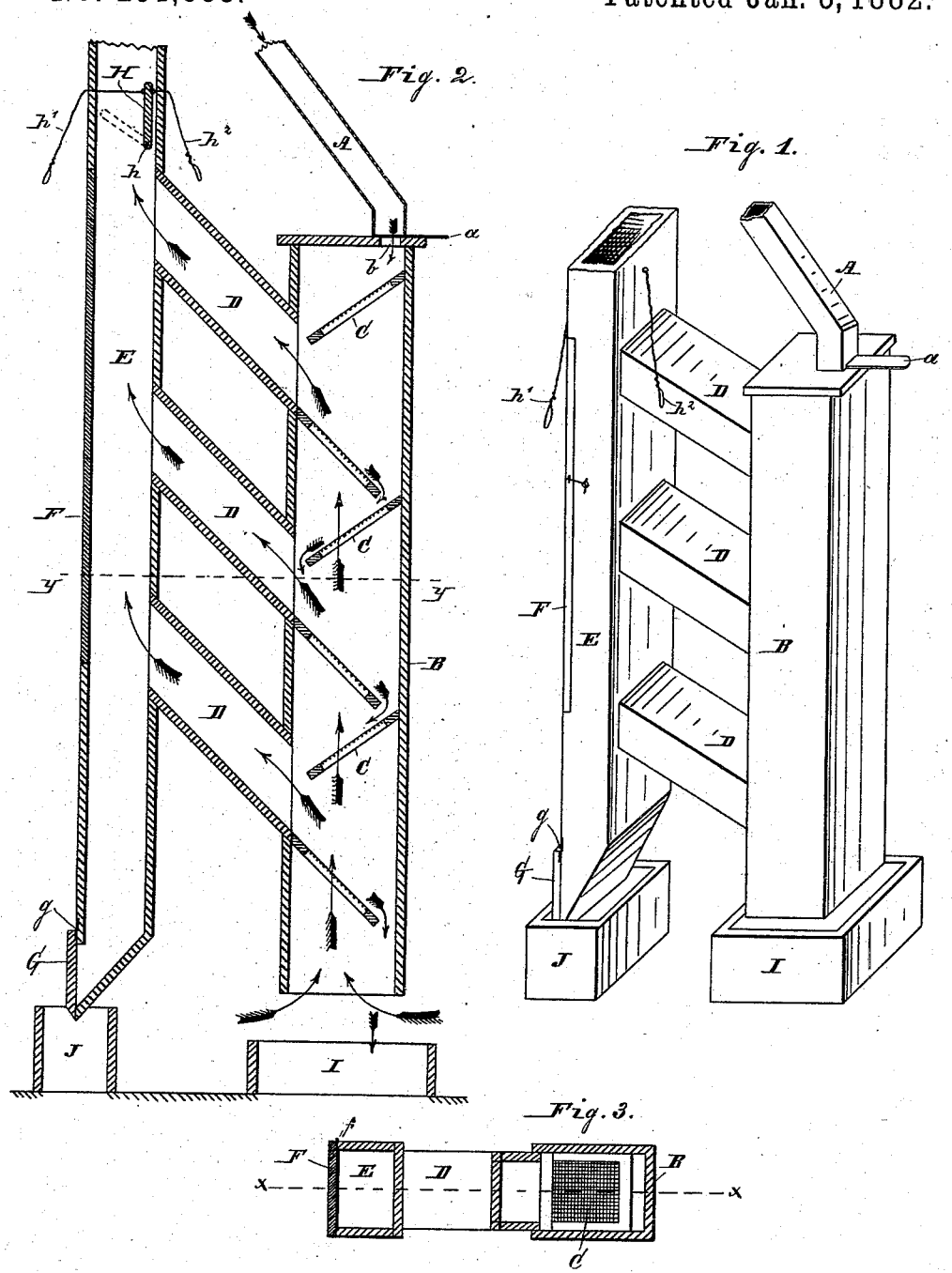

WILLIAM C. HOLMES, OF INDIANAPOLIS, INDIANA.

GRAIN-CLEANER.

SPECIFICATION forming part of Letters Patent No. 251,883, dated January 3, 1882.

Application filed August 2, 1881. (No model.)

*To all whom it may concern:*

Be it known that I, WILLIAM C. HOLMES, of the city of Indianapolis, county of Marion, and State of Indiana, have invented certain new and useful Improvements in Grain-Cleaners, of which the following is a specification.

The object of my said invention is to produce a means for thoroughly cleaning grain, such as corn, wheat, rye, &c., from foul seed and other extraneous matters which are lighter in proportion to their bulk than the grain which is undergoing the process.

It consists of a spout, through which the grain shall fall, containing several inclines, (preferably made of wire-netting or other material containing perforations,) which prevent the grain from falling too rapidly and in too solid a mass, and connections with a tube connected with a suction-fan, as will hereinafter be more specifically described.

Referring to the accompanying drawings, which are made a part hereof, and on which similar letters of reference indicate similar parts, Figure 1 is a perspective view of my improved apparatus; Fig. 2, a vertical section thereof on the dotted line $x\,x$; and Fig. 3, a horizontal section, looking downwardly from the dotted line $y\,y$.

In said drawings, the portions marked A represent the spout through which the grain enters my improved device; B, the spout through which the grain passes in being cleaned; C, the inclines therein over which the grain passes; D, the tubes connecting the spout B to the suction-tube; E, the suction-tube; F, a door thereto; G, a smaller door at the bottom thereof; H, a damper-like device or trap by which the orifice of the tube E may be diminished or closed; I, a hopper into which the tube B discharges, and J a similar hopper for the tube E.

The spout A is an ordinary conveying spout for grain, and is provided at the mouth with a gate, $a$, by which the quantity of grain passing through the same may be regulated.

The spout B is a plain square box externally, which I have been in the habit of constructing about nine and a half by twelve inches in diameter and six feet long, with an opening, $b$, in the top to admit the grain, other openings in one side corresponding to the mouth of the pipes D, and the bottom entirely open.

The inclines C, I have constructed by making rectangular frames, and placing thereon a piece of wire-netting, and securing the same to the sides of the spout B, running them alternately toward one side or the other, as shown, and leaving an open space at the lower end of each, so as to force the grain to pass over all of them on its way through said spout.

The tubes D connect the spouts B and E and should incline upwardly toward the latter, as shown, so that nothing will be liable to remain therein, but will rather slide down into the spout B, and also so that nothing which cannot be lifted by the force of the suction employed can be drawn through them.

The spout E is connected with an exhaust-fan of sufficient power to keep a strong draft of air constantly ascending it. As it is usually kept tightly closed at the bottom and sides, the air is necessarily drawn through the tubes D from the spout B in the course indicated by the arrows.

The door F is provided as a means of access to the spout. The door G is hung from the top by hinges $g$, and is kept closed by the suction, or a weight or spring, until purposely opened, or until the foul matter which accumulates in said spout E is of sufficient weight to push it open. This spout is about seven and a half by nine and a half inches in diameter.

The trap H is secured by pivots $h$ to near one side of the spout E. Strings $h'\,h^2$ or some other means are employed whereby the trap can be conveniently opened or closed or made to occupy a partially-closed position at will, and thus regulate the force of the draft of air through the spout E.

The operation of my invention is as follows: The grain is admitted to the spout B through the spout A, and travels more or less rapidly down the inclines C, according to the angle at which they are set. The exhaust-fan (not shown) keeps up a brisk draft through the said spout by exhausting the air in the spout E, and thus draws into said spout all the lighter matters passing down with the grain, and either discharges them into the bottom of said spout against the trap-door G or carries them off to the fan and blows them out there or beyond. The grain, being well stirred up by passing over the several inclines and subjected continually to the air-blast by means of the several tubes D and the perforations in the inclines, becomes most thoroughly cleaned before it reaches the bottom. The greater part of the dirt, when it reaches the spout E, drops to the bottom and is removed through the door G. The direction of the grain through this machine is indicated by short arrows and the direction of the air blast or current by long arrows. The reason that no means of producing this current is shown is because the means is immaterial.

This invention has been put in use in hominy-mills, where it is of great value. It is also adapted for use in flouring-mills and in all places where it is desired to thoroughly clean grain.

Having thus fully described my said invention, what I claim as new, and desire to secure by Letters Patent, is—

1. The combination of the cleaning-spout B, containing perforated inclines C and located above the hopper I, the suction-tube E, constructed as shown, and the tubes D, connecting said spout and said tube, all substantially as shown and described, and for the purposes specified.

2. The combination of the grain-spout A, cleaning-spout B, wire-netting inclines C, connecting-tubes D, and suction-tube E, having trap-door G and regulating-door H, all substantially as shown and specified.

In witness whereof I have hereunto set my hand and seal, at Indianapolis, Indiana, this 29th day of July, A. D. 1881.

WILLIAM C. HOLMES. [L. S.]

In presence of—
C. BRADFORD,
A. C. GROOMS.